United States Patent [19]

Kato et al.

[11] Patent Number: 4,652,461
[45] Date of Patent: Mar. 24, 1987

[54] METHOD FOR MAKING MAGNETIC RECORDING MEDIUM

[75] Inventors: Mikihiko Kato; Shinichi Kato; Kazunori Komatsu; Shigeo Komine, all of Kanagawa, Japan

[73] Assignee: Fuji Photo Film Co., Ltd., Kanagawa, Japan

[21] Appl. No.: 814,989

[22] Filed: Dec. 31, 1985

[30] Foreign Application Priority Data

Jan. 9, 1985 [JP] Japan ................................ 60-1952

[51] Int. Cl.$^4$ .......................................... B05D 3/14
[52] U.S. Cl. ..................................... 427/48; 427/130
[58] Field of Search ................................ 427/48, 130

Primary Examiner—Bernard D. Pianalto
Attorney, Agent, or Firm—Gerald J. Ferguson, Jr.; Michael P. Hoffman; Ronni S. Malamud

[57] ABSTRACT

In a method of and apparatus for making a magnetic recording medium, a plurality of rod-like orientation magnets are positioned in spaced relation in the movement direction of a non-magnetic substrate so that the magnetic pole facing the non-magnetic substrate is different between adjacent orientation magnets and the orientation magnets are oblique with respect to the substrate movement direction and alternately point reversely. The spaces between the orientation magnets are adjusted so that the intensity of the magnetic field generated in the substrate movement direction between adjacent orientation magnets is 50 Oe or less. A magnetic coating composition is applied onto the non-magnetic substrate, and magnetic grains contained in the composition are randomly orientated by the orientation magnets.

4 Claims, 3 Drawing Figures

METHOD FOR MAKING MAGNETIC RECORDING MEDIUM

BACKGROUND OF THE INVENTION

1. Field of the Invention

This invention relates to a method of making a magnetic recording medium by applying a magnetic recording layer onto a strip-like non-magnetic substrate by a coating process, and an apparatus for carrying out the method. This invention particularly relates to a method of making a magnetic recording medium in which magnetic grains in the magnetic recording layer are randomly orientated, and an apparatus for carrying out the method.

2. Description of the Prior Art

In general, magnetic recording media such as flexible magnetic disks and magnetic sheets are made by continuously moving a strip-like non-magnetic substrate in the longitudinal direction thereof, and applying a magnetic coating composition onto the strip-like non-magnetic substrate by a known coating process such as top reverse-roll coating, bottom reverse-roll coating, doctor coating or gravure coating. The strip-like non-magnetic substrate is fabricated, for example, of polyethylene terephthalate, triacetyl cellulose, diacetyl cellulose, polyvinylidene chloride or polypropyrene. The magnetic coating composition comprises a binder dissolved in a solvent, and ferromagnetic fine grains such as $\gamma$-$Fe_2O_3$, $Fe_3O_4$, Co-doped $\gamma$-$Fe_2O_3$, Co-doped $Fe_3O_4$, and $CrO_2$ dispersed therein. As the binder, there has heretofore been used a vinyl chloride-vinyl acetate copolymer, a vinyl chloride-acrylonitrile copolymer, an acrylic ester-acrylonitrile copolymer, an acrylic ester-vinylidene chloride copolymer, other copolymers with acrylic acid, an urethane elastomer, a nylon-silicone resin, nitrocellulose, polyvinyl chloride, a vinylidene chloride-acrylonitrile copolymer, a polyamide resin, a polyvinyl butyral, a cellulose derivative, a styrene-butadiene copolymer, a phenolic resin, an epoxy resin, a polyurethane, a urea resin, a melamine resin, a polyester resin, a chlorovinyl ether-acrylic ester copolymer, a methacrylate copolymer-diisocyanate blend polymer, an amino resin, or a synthetic rubber. Then, the coating film thus applied onto the strip-like non-magnetic substrate is dried and hardened, and the substrate is punched or cut to form the magnetic recording medium. However, when the ferromagnetic fine grains (hereinafter referred to as magnetic grains) are orientated in a specific direction during manufacturing of the magnetic recording medium and anisotropy is generated in the magnetic recording medium, anisotropy also arises in the magnetic characteristics and the electromagnetic characteristics in various directions.

For example, in the case where the magnetic recording medium is a magnetic disk, when the magnetic grains are orientated in the coating direction of the magnetic coating composition, i.e. in the movement direction of the non-magnetic substrate, the level of reproduction output signal in the coating direction becomes higher than those in the other directions and, as a result, the level of reproduction output signal detected from the magnetic disk changes as the magnetic disk rotates. This phenomenon is generally called modulation.

Accordingly, when magnetic disks or the like are made by the coating process, an attempt has heretofore been made to physically eliminate orientation of the magnetic grains or to shield the magnetic field so that it does not act on the magnetic grains. However, there still arises the problem that the magnetic grains exhibit linear directivity due to flow orientation during application of the magnetic coating composition.

In order to eliminate flow orientation of the magnetic grains arising immediately after application of the magnetic coating composition, it has been proposed, for example, in Japanese Unexamined Patent Publication Nos. 53(1978)-104206 and 54(1979)-149607, to orientate the magnetic grains in one direction by a first orientation magnetic field before the applied magnetic coating composition hardens and then to orientate the magnetic grains reversely to the first orientation direction by a second orientation magnetic field of a level lower than the level of the first orientation magnetic field. However, with this method, the flow orientation cannot be eliminated sufficiently since the magnetic field can act only in the substrate movement direction and in the reverse direction.

It has also been proposed, for example, in British Pat. No. 933,762, to position a rod-like orientation magnet obliquely with respect to the movement direction of a non-magnetic substrate and to have a magnetic field act from the orientation magnet on the magnetic coating composition before it hardens, thereby randomly orientating the magnetic grains. However, with a single stage of magnetic field application, it is not always possible to achieve sufficient random orientation of the magnetic grains.

SUMMARY OF THE INVENTION

The primary object of the present invention is to provide a method of making a magnetic recording medium wherein flow orientation of magnetic grains arising when the magnetic recording medium is made by the coating process is eliminated securely.

Another object of the present invention is to provide a method of making a magnetic recording medium exhibiting high performance.

The specific object of the present invention is to provide an apparatus for carrying out the method.

The present invention provides a method of making a magnetic recording medium by applying a magnetic coating composition containing magnetic grains onto a strip-like non-magnetic substrate moved continuously, and having a magnetic field act on the applied magnetic coating composition to orientate the magnetic grains randomly before the applied magnetic coating composition hardens, the method comprising the steps of:

(i) positioning a plurality of rod-like orientation magnets in spaced relation in the movement direction of said non-magnetic substrate so that the magnetic pole facing said non-magnetic substrate is different between adjacent orientation magnets and said orientation magnets are oblique with respect to said movement direction of said non-magnetic substrate and alternately point reversely, (ii) adjusting the spaces between said orientation magnets so that the intensity of a magnetic field generated in said movement direction of said non-magnetic substrate between adjacent orientation magnets is 50 Oe (oersted) or less, and (iii) randomly orientating said magnetic grains by said orientation magnets.

The method of the present invention is carried out by an apparatus comprising:

(i) a substrate movement means for continuously moving a strip-like non-magnetic substrate, (ii) a coating means for applying a magnetic coating composition containing magnetic grains onto said non-magnetic substrate moved by said substrate movement means, and (iii) a plurality of rod-like orientation magnets positioned in spaced relation in the movement direction of said non-magnetic substrate and having a magnetic field act on said magnetic coating composition applied onto said non-magnetic substrate to orientate said magnetic grains randomly before said magnetic coating composition hardens, said orientation magnets being positioned so that the magnetic pole facing said non-magnetic substrate is different between adjacent orientation magnets and said orientation magnets are oblique with respect to said movement direction of said non-magnetic substrate and alternately point reversely, the spaces between said orientation magnets being adjusted so that the intensity of the magnetic field generated in said movement direction of said non-magnetic substrate between adjacent orientation magnets is 50 Oe (oersted) or less.

In the present invention it is possible to achieve sufficient random orientation of the magnetic grains by use of simple means, and therefore to make a magnetic recording medium exhibiting high performance and low modulation.

DESCRIPTION OF THE PREFERRED EMBODIMENTS

The present invention will hereinbelow be described in further detail with reference to the accompanying drawings.

Figure 1:
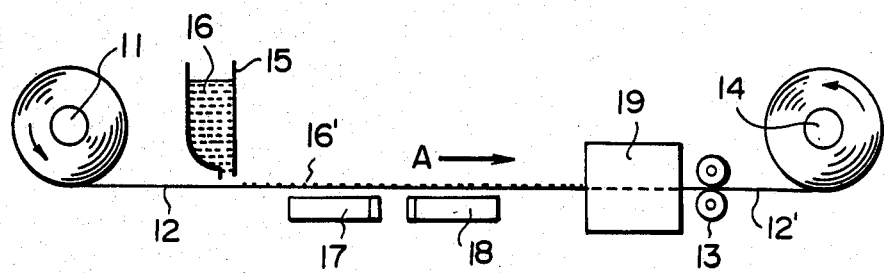
FIG. 1 is a schematic view showing an embodiment of the apparatus for making a magnetic recording medium in accordance with the present invention.

Referring to FIG. 1, a long strip-like non-magnetic substrate 12 is continuously fed in the direction as indicated by the arrow A from a delivery roll 11 by conveying rolls 13 acting as a substrate movement means, and is wound up around a wind-up roll 14. A coating head 15 is positioned adjacent the surface (upper surface in FIG. 1) of the non-magnetic substrate 12 moved continuously, and a magnetic coating composition 16 is applied by the coating head 15 onto the surface of the non-magnetic substrate 12. The magnetic coating composition 16 comprises a binder dissolved in a solvent and magnetic grains dispersed therein. By the application of the magnetic coating composition 16, a magnetic coating film 16' is overlaid on the surface of the non-magnetic substrate 12. As the non-magnetic substrate 12 and the magnetic coating composition 16, the materials as described above may be used.

A first rod-like orientation magnet 17, a second rod-like orientation magnet 18, and a drying means 19 such as an oven are positioned on the side downstream of the coating head 15 in the movement direction of the non-magnetic substrate 12 as indicated by the arrow A. When the non-magnetic substrate 12 passes near the first orientation magnet 17 and the second orientation magnet 18 before the magnetic coating film 16' overlaid on the substrate 12 hardens, the magnetic grains contained in the magnetic coating film 16' are randomly orientated by the orientation magnets 17 and 18. Then, the coating film 16' is dried and hardened as it passes through the drying means 19. In this manner, a sheet-like magnetic recording medium 12' which comprises the non-magnetic substrate 12 and the magnetic recording layer containing the magnetic grains overlaid on the non-magnetic substrate 12 is obtained. Magnetic disks or the like are obtained by punching or cutting the magnetic recording medium 12'.

Figure 2:
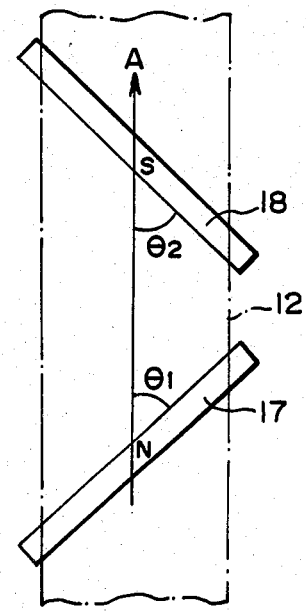
FIGS. 2 and 3 are a plan view and a perspective view showing in detail the rod-like orientation magnets used in the embodiment of FIG. 1.
Figure 3:
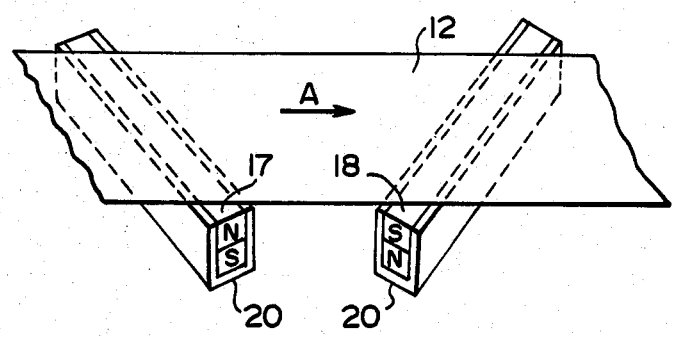

Random orientation of the magnetic grains by the orientation magnets 17 and 18 will hereinbelow be described in detail with reference to FIGS. 2 and 3. As shown in FIG. 2, the first orientation magnet 17 is inclined at an angle 81 with respect to the movement direction of the non-magnetic substrate 12 as indicated by the arrow A. The second orientation magnet 18 is inclined reversely to the first orientation magnet 17 at an angle 82 with respect to the substrate movement direction as indicated by the arrow A. As shown in FIG. 3, the first orientation magnet 17 and the second orientation magnet 18 are positioned so that the magnetic poles facing the non-magnetic substrate 12 are different from each other. The magnetic poles of the orientation magnets 17 and 18 on the side opposite to the non-magnetic substrate 12 are shielded by yokes 20, 20 so that the magnetic fields generated by these magnetic poles act strongly on the magnetic coating film 16'. As the orientation magnets 17 and 18, there may be used rare earth cobalt magnets, alnico magnets, Ba-ferrite magnets, or the like. Also, the orientation magnets 17 and 18 are spaced sufficiently so that the intensity of the magnetic field generated in the substrate movement direction as indicated by the arrow A between the orientation magnets 17 and 18 is 50 Oe (oersted) or less. Of course, the intensity of the magnetic field is largest at the position (right end in FIG. 2) where the space between the orientation magnets 17 and 18 is the minimum. Therefore, the orientation magnets 17 and 18 should be spaced so that the intensity of the magnetic field at this position is 50 Oe or less.

When the magnetic coating film 16' applied onto the non-magnetic substrate 12 passes near the first orientation magnet 17 and the second orientation magnet 18, the magnetic grains contained in the magnetic coating film 16' are orientated randomly. Specifically, before the magnetic coating film 16' comes to the vicinity of the first orientation magnet 17, the magnetic grains contained in the magnetic coating film 16' are orientated mainly in the substrate movement direction as indicated by the arrow A due to flow orientation generated during application of the magnetic coating composition 16. However, when the magnetic coating film 16' passes near the first orientation magnet 17, some of the magnetic grains are orientated in the longitudinal direction of the first orientation magnet 17 by the action of the magnetic field generated by the first orientation magnet 17. Then, when the magnetic coating film 16' passes near the second orientation magnet 18, some of the magnetic grains (mainly those which were not orientated by the first orientation magnet 17) are orientated in the longitudinal direction of the second orientation magnet 18. As a result, the magnetic grains are randomly orientated as a whole.

In order to achieve random orientation of the magnetic grains as described above, the first orientation magnet 17 and the second orientation magnet 18 should preferably be positioned so that the angle formed therebetween is 90° (i.e. θ1+θ2=90°). Of course, the orientation magnets 17 and 18 should extend over the entire width of the non-magnetic substrate 12. Therefore, if the angles 74 1 and θ2 are too small, it becomes necessary to use very long orientation magnets 17 and 18. On the other hand, if the angles θ1 and θ2 are too large, it becomes difficult to exert transverse force on the flow-orientated magnetic grains. Accordingly, the angles θ1 and θ2 should preferably be within the range of 30° to 60°. Also, in order to make the orientation magnets 17 and 18 as short as possible and to maximize the transverse force acting on the magnetic grains, the angles θ1 and θ2 should most preferably be adjusted to 45°.

When the intensity of the magnetic field acting from the second orientation magnet 18 on the magnetic coating film 16' is higher than the intensity of the magnetic field at the first orientation magnet 17, the magnetic grains are orientated in a single direction by the second orientation magnet 18. Therefore, the intensity of the magnetic field at the second orientation magnet 18 should preferably be adjusted lower than the intensity of the magnetic field at the first orientation magnet 17. To achieve this, a magnet exhibiting the surface magnetic field intensity lower than the surface magnetic field intensity of the first orientation magnet 17 may be used as the second orientation magnet 18, or the second orientation magnet 18 may be spaced at a larger distance from the non-magnetic substrate 12 than is the first orientation magnet 17. As the non-magnetic substrate 12 is moved, natural drying of the magnetic coating film 16' advances and the magnetic grains become less orientatable. Therefore, in some cases, the intensity of the magnetic field acting on the magnetic coating film 16' may be adjusted to the same value both at the first orientation magnet 17 and the second orientation magnet 18.

Also, when a too strong magnetic field is generated between the first orientation magnet 17 and the second orientation magnet 18, random orientation of the magnetic grains is not effected efficiently. Therefore, the space between the first orientation magnet 17 and the second orientation magnet 18 should be adjusted so that the intensity of the magnetic field generated in the substrate movement direction as indicated by the arrow A between the orientation magnets 17 and 18 is 50 Oe or less, preferably 20 Oe or less.

The magnetic field intensity acting from the orientation magnets 17 and 18 on the magnetic coating film 16' may be adjusted in accordance with the difference in degree of flow orientation of the magnetic grains caused by the type of the magnetic grains, coercive force, viscosity of the magnetic coating composition 16, coating process or the like. In general, the magnetic field intensity is adjusted to a value within the range of 20 to 500 Oe.

There may be used three or more rod-like orientation magnets for effecting random orientation of the magnetic grains. Two to ten orientation magnets should preferably be used, and more preferably two to five orientation magnets should be used. Also when three or more rod-like orientation magnets are used, the spaces therebetween must be adjusted so that the intensity of the magnetic fields generated in the substrate movement direction between the orientation magnets is 50 Oe or less. In this case, too, the orientation magnets positioned oblique with respect to the substrate movement direction must alternately point reversely, and the magnetic poles facing the non-magnetic substrate must change alternately. Also, as mentioned above, the magnetic fields acting from the respective orientation magnets on the magnetic coating film should preferably be adjusted so that the intensity thereof decreases gradually in the movement direction of the non-magnetic substrate (generally with a difference within the range of 0 to 50 Oe). Since the rod-like orientation magnets are positioned obliquely with respect to the substrate movement direction, the time interval between the application of the magnetic coating composition and orientation, and the degree of natural drying of the applied magnetic coating composition are different between the right end side and the left end side of the non-magnetic substrate. Therefore, it may occur that the condition of random orientation of the magnetic grains be different between the right end side and the left end side of the non-magnetic substrate. In such a case, the problem may be solved by adjusting so that the surface magnetic field intensity of the rod-like orientation magnets is different in the longitudinal direction of the magnets (namely, so that the magnetic field becomes stronger toward the magnet end portion farther from the position of application of the magnetic coating composition).

The present invention will further be illustrated by the following nonlimitative examples.

EXAMPLES

A magnetic coating composition having a viscosity of 70 poises and containing the following constituents was used:

| | |
|---|---|
| Magnetic grains: $\gamma\text{-}F_2O_3$ | 400 parts |
| Binder: | |
| Polyurethane (Nipporan 3022) | 60 parts |
| Vinyl chloride-vinyl acetate copolymer (VMCH) | 40 parts |
| Dispersant: Lecithin | 6 parts |
| Lubricant: Stearic acid | 5 parts |
| Carbon: | 30 parts |
| Solvent: | |
| Methyl ethyl ketone | 500 parts |
| Methyl isobutyl ketone | 200 parts |
| Cyclohexanone | 200 parts |

The magnetic coating composition was applied onto a 75 μm-thick polyethylene terephthalate substrate film at a coating speed of 100 m/minute so that the thickness of a dry magnetic coating film was 3 μm, and at the same time magnetic grains contained in the applied magnetic coating composition were randomly orientated by use of a plurality of rod-like orientation magnets as described above. After the magnetic coating film was dried and hardened, the substrate film provided with the magnetic coating film overlaid thereon was punched into 8 inch-diameter magnetic disks. Modulation (i.e. fluctuation in reproduction output level in the circumferential direction) of the magnetic disks was measured. The results of the measurement are shown in the table below. In Examples I, II and III, the magnetic disks were made by the method in accordance with the present invention. In Comparative Examples IV and V, the magnetic disks were made without using the method in accordance with the present invention. Specifically, in Comparative Example IV, the intensity (maximum value) of the magnetic field generated in the movement direction of the substrate film (non-magnetic substrate) between two rod-like orientation magnets was adjusted to 80 Oe, instead of 50 Oe or less. In Comparative Example V, random orientation with the rod-like orientation magnets was not conducted. The magnet angle $\theta n$ denotes the angle of the n'th rod-like orientation magnet as counted from upstream of the movement direction of the substrate film with respect to the movement direction of the substrate film. The magnetic field intensity Bn denotes the intensity (Oe) of the magnetic field acting from the n'th rod-like orientation magnet on the magnetic coating composition applied onto the substrate film. The modulation is expressed by $$(V-v)/(V+v)\times 100 \ (\%)$$

where V and v respectively designate the maximum and minimum outputs in reproduction during one turn of the recording track.

| Example | I | II | III | IV | V |
|---|---|---|---|---|---|
| Number of Magnets | 2 | 2 | 3 | 2 | 0 |
| Magnet Angle | | | | | |
| $\theta 1$ | 45° | 30° | 60° | 45° | — |
| $\theta 2$ | 45° | 60° | 60° | 45° | — |
| $\theta 3$ | — | — | 60° | — | |
| Magnetic Field Intensity Oe | | | | | |
| B1 | 120 | 120 | 140 | 120 | |
| B2 | 120 | 120 | 120 | 120 | — |
| B3 | — | — | 100 | — | |
| Max. Magnetic Field Intensity between Magnets Oe | 0 | 0 | 0 | 80 | — |
| Modulation % | 1.5 | 2.2 | 2.3 | 5.4 | 8.7 |

As clear from the table, the magnetic disks made by the method in accordance with the present invention exhibits modulation of less than 3%, the value which is markedly lower than modulation (5.4%, 8.7%) of the magnetic disks of Comparative Examples IV and V.

We claim:

1. A method of making a magnetic recording medium by applying a magnetic coating composition containing magnetic grains onto a strip-like non-magnetic substrate moved continuously, and having a magnetic field act on the applied magnetic coating composition to orientate the magnetic grains randomly before the applied magnetic coating composition hardens, the method comprising the steps of:

(i) positioning a plurality of rod-like orientation magnets in spaced relation in the movement direction of said non-magnetic substrate so that the magnetic pole facing said non-magnetic substrate is different between adjacent orientation magnets and said orientation magnets are oblique with respect to said movement direction of said non-magnetic substrate and where successive ones of said orientation magnets point toward an imaginary line extending between them transverse to said movement direction of the non-magnetic substrate such that an angle is formed between said successive ones of the orientation magnets, the apex of the angle being located on or near said imaginary line, (ii) adjusting the spaces between said orientation magnets so that the intensity of a magnetic field generated in said movement direction of said non-magnetic substrate between adjacent orientation magnets is 50 Oe (oersted) or less, and (iii) randomly orientating said magnetic grains by said orientation magnets.

2. A method as defined in claim 1 wherein said plurality of rod-like orientation magnets are positioned so that the angle between adjacent orientation magnets is 90°.

3. A method as defined in claim 2 wherein said plurality of rod-like orientation magnets are positioned at an angle of 45° with respect to said movement direction of said non-magnetic substrate.

4. A method as defined in claim 1, 2 or 3 wherein the intensity of magnetic fields acting from said plurality of rod-like orientation magnets on said magnetic coating composition applied onto said non-magnetic substrate is decreased gradually in said movement direction of said non-magnetic substrate.

* * * * *